March 27, 1928.
J. R. LOWREY
1,664,125
HOSE COUPLING
Filed Nov. 10, 1926
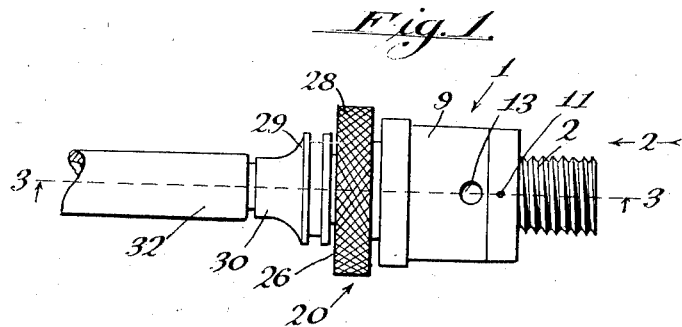
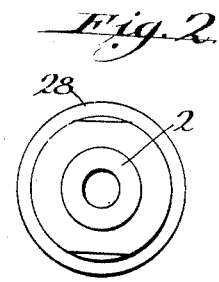
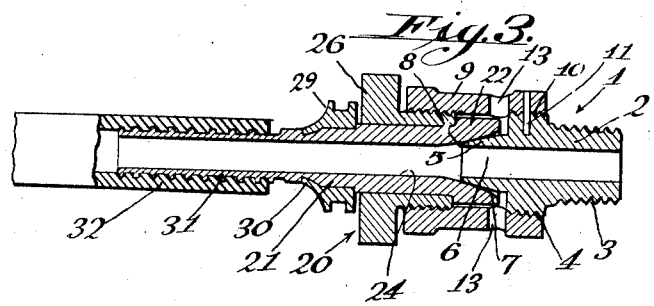
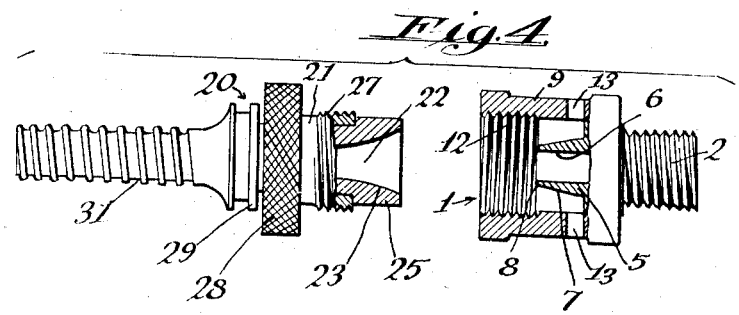
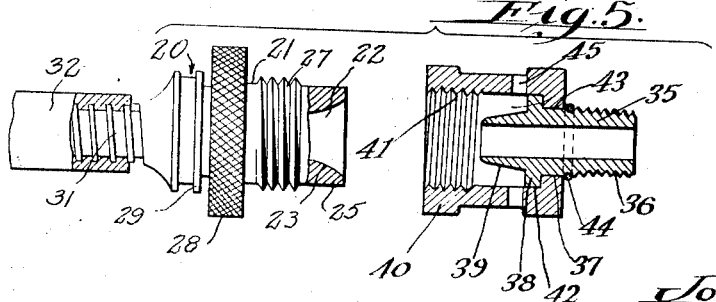
Inventor
John R. Lowrey.
by Hazard and Miller
Attorneys Patented Mar. 27, 1928.

1,664,125

UNITED STATES PATENT OFFICE.

JOHN R. LOWREY, OF SAN FRANCISCO, CALIFORNIA.

HOSE COUPLING.

Application filed November 10, 1926. Serial No. 147,448.

My invention pertains to hose couplings and is of a type requiring no gaskets, forming a gas or liquid tight joint, and is provided with a self-cleaning construction whereby the contacting surfaces of the joint will be automatically cleansed, thus forming a tight joint.

An object of my invention is the construction of a coupling which may be used as a hose coupling for transmission of gases such as air, or liquids such as water, oil or acids, the contacting surfaces forming the joint being a metal to metal surface. The coupling is provided with cleansing openings so that any dirt which collects on the meeting surfaces of the joint is freed from same, being blown or washed out of the coupling, allowing a tight fitting joint.

In constructing my coupling I have one element of same provided with a projecting tapering element of the type of a male element of a coupling, having preferably an exteriorly coned bearing surface. This coupling member is provided with a guard cup internally threaded extending beyond the projection. One or more cleaning openings are provided at the base of the guard cup. The complementary coupling member is of the female type and has an internally tapered surface which is formed on a curve, therefore, having a curved bearing surface which forms a tight joint with the exteriorly coned bearing surface of the projecting element on the first mentioned coupling member. In order to clamp the two coupling members tightly together, the female member is provided with a rotatable collar having a screw threaded portion which engages in the screw threads of the guard cup, thus drawing the bearing surfaces into tight contact.

The cleansing of the coupling to allow a tight seat is through the cleansing openings at the base of the guard cup and if the couplings should not be tight so that it leaks, this can be relieved by slightly loosening the coupling and allowing the flow of gas or liquid to pass between the socket member and the projecting element blowing the dirt out of the cleansing openings. The coupling will then be tightly clamped together.

My invention in its various aspects will be understood from the following description and drawings, in which:

Figure 1 is a side elevation of my coupling connected.

Figure 2 is an end elevation taken in the direction of the arrow 2 of Fig. 1.

Figure 3 is a longitudinal section on the line 3—3 of Fig. 1 in the direction of the arrows.

Figure 4 is a side elevation, partly broken away, of the two coupling members disconnected and in position for connecting same together.

Figure 5 is a longitudinal sectional view of a modification of the coupling.

Referring to the drawings, the male element of the coupling is designated generally by the numeral 1 and may be termed the fixed coupling element. This is constructed substantially as follows, in the structure set forth in Figs. 1 through 4:

A tubular body 2 has exterior threads 3 at one end for connecting to any suitable structure for which the coupling is used, and has a screw threaded flange 4. The projecting plug element 5 extends beyond the flange opposite the screw threaded end 3 and is preferably cylindrical on its inner surface 6 and is coned at its outer surface 7 with a slightly rounded end edge 8. It is to be understood that the exterior surfaces may be different from those set forth, a characteristic of the projecting tapering element being that it is so reduced at its outer end that it may be squeezed by the complementary bearing surface and thus form a tight seal.

The guard cup 9 is preferably formed by having an internally screw threaded base 10 which is fitted on the screw thread support and preferably secured in place by a dowel pin 11 or the like. The outer end of the guard cup 9 has internal threads 12. Cleaning openings 13 are provided in the base of the guard cup 9. These are shown positioned laterally but they may be made by drilling holes through the flange 4, or partly through the flange 4 and the base end of the guard cup 9. The above structure illustrates a simple way of manufacturing the male end of the coupling but it is to be understood that this may be departed from. The tubular part 2, the projecting element 5, and the guard cup 9, might be formed integral.

The female coupling element is designated generally by the numeral 20, this being formed with a tubular body 21 having a socket structure 22 at one end. This socket structure preferably has a curved surface 23 of the countersunk type gradually emerging into the cylindrical bore 24 of the tubular section. There is sufficient backing metal 25 in the socket to withstand any lateral pressure which may develop through the pressure on the projecting tapering plug 5 of the male coupling member.

A rotatable collar 26 is mounted on the tubular body 21 and has an exteriorly threaded section 27 to engage the threads 12 on the guard cup. This collar is provided with a flange having a knurled periphery 28 to allow ready turning of same with the fingers. An abutment 29 is fitted on the tubular body 21 and has the ends 30 wedged into said body forming a rigid abutment and restraining the lengthwise movement of the collar 26. The free end 31 of the female coupling element is preferably screw threaded with coarse threads or any other suitable corrugations or roughenings to allow connection of a hose 32 or the like to such coupling member.

The manner of functioning of my coupling, as above described, is substantially as follows:

Presuming the male member 1 is held stationary, the female coupling element 2 is connected therewith by rotating the collar 26, the external threads 27 of which threading into the internal threads 12 of the guard cup 9 bring the projecting plug 5 into engagement with the socket 22, the bearing surfaces contacting. If these surfaces are clean, a tight coupling can readily be effected as an annular bearing surface is formed by these coupling elements and the tighter the couplings are screwed together the closer is the joint so formed. Should it be found that the joint leaks, the coupling may be loosened slightly and the gas or liquid being transmitted allowed to pass through the coupling, in which case the dirt will be blown off the bearing surfaces and out the cleansing openings 13.

If compressed air is being passed through the coupling, it will be readily seen that no matter on which element the dirt or obstruction is collected, whether on the projecting element 5 or on the socket 22, it will be blown out of the cleansing openings 13. If the coupling is found to leak a liquid passing therethrough, if the coupling is loosened slightly the matter preventing the bearing surfaces contacting will be washed out allowing a tight contact. It is to be understood that as a general rule the gas such as air, or liquids, should pass from the hose connection to the male or fixed coupling member.

In the construction shown in Fig. 5 I utilize a tubular male coupling 35 having external screw threads 36, a cylindrical section 37, a flange 38 extending beyond the cylindrical section, and a tapered plug element 39 constructed and shaped substantially similar to the element 5 of Fig. 4. The guard cup structure 40 is internally threaded at its outer end 41, and has an interior cylindrical surface 42 bearing on the outside of the flange 38, and an inturned rim 43 engaging the cylindrical part 37 of the tubular element 35. A wire clamp 44 or the like is attached to the element 35 to prevent removal of the guard cup or nut 40. The clean out openings in the guard cup 40 are designated by the numeral 45.

From the above construction it will be seen that the guard cup or nut is rotatably mounted on the tubular structure 35 having the tapered plug element. This male coupling element may then be connected to a female coupling element, such as shown in connection with Figs. 1 through 4, in which the socket and the plug form a tight bearing. In this construction, as the guard cup is rotatable, the threads may be formed in a fixed relation to the structure having the socket element as the rotating guard cup will clamp the two coupling members tightly together. This coupling thus functions substantially the same as that shown in Figs. 1 through 4, and any dirt collecting on the socket or the plug element may be readily blown or washed out through the cleaning openings.

It will thus be seen that I have developed a coupling which has a metal to metal bearing joint, that the parts may be threaded together to produce any desired or suitable pressure on the bearing surfaces and thus make a joint to accommodate the transmission of low or high pressure gases or liquids, also I have produced a coupling which is self-cleaning, the dirt being readily blown or washed out, and moreover the coupling has no gaskets or the like which would require renewal.

My invention herein disclosed may be considered an improvement on my patent for hose coupling No. 1,517,242, dated December 2, 1924.

Various changes may be made in the principles of my invention without departing from the spirit thereof, as set forth in the description, drawings and claims.

I claim:

1. A coupling comprising in combination a tubular male coupling element having a plug with a tapered exterior surface at one end, external screw threads at the other end, a cylindrical section between said ends, a guard cup or nut rotatably mounted on the cylindrical section, means interengaging the tubular element and the cup to restrain their longitudinal movement, the cup having internal threads, a tubular complementary female element having a socket, and with screw threads external of said socket, said screw threads engaging the threads of the guard cup there being a cleanout opening to allow discharge of dirt from between the plug and socket.

2. In a coupling a tubular male coupling element having a plug at one end with an externally tapered surface, external screw threads at the other end, a cylindrical section and a flange adjacent the base of the plug, a guard cup having internal screw threads at one end and an inturned rim at the other end, the inturned rim engaging over the said flange and bearing on the cylindrical section, and means to retain the rim in an adjusted position against the flange there being a cleanout opening adjacent the base of the plug.

In testimony whereof I have signed my name to this specification.

JOHN R. LOWREY.